(12) United States Patent
Jen

(10) Patent No.: US 7,620,413 B2
(45) Date of Patent: Nov. 17, 2009

(54) METHOD FOR IMPLEMENTING PUSH-TO-TALK OVER SIP AND MULTICAST RTP RELATED SYSTEM

(75) Inventor: Chien-Maw Jen, Taipei (TW)

(73) Assignee: Unication Co., Ltd., Hsin Chuang, Taipei Hsien (TW)

( * ) Notice: Subject to any disclaimer, the term of this patent is extended or adjusted under 35 U.S.C. 154(b) by 494 days.

(21) Appl. No.: 11/689,514

(22) Filed: Mar. 22, 2007

(65) Prior Publication Data

US 2008/0233990 A1    Sep. 25, 2008

(51) Int. Cl.
*H04B 7/00* (2006.01)
(52) U.S. Cl. .................. 455/518; 455/519; 455/503; 370/401; 370/395.5
(58) Field of Classification Search .......... 455/518, 455/519, 503, 414.3, 412.2, 413, 420, 517, 455/521; 370/401, 395.5, 395.52, 270; 709/204, 709/206, 9
See application file for complete search history.

(56) References Cited

U.S. PATENT DOCUMENTS

2003/0235184 A1* 12/2003 Dorenbosch et al. ........ 370/352
2006/0116149 A1* 6/2006 Dunn et al. .................. 455/518
2007/0214217 A1* 9/2007 Ueno et al. .................. 709/204
2008/0101340 A1* 5/2008 Bernath ....................... 370/352

* cited by examiner

*Primary Examiner*—Tan Trinh
(74) *Attorney, Agent, or Firm*—Winston Hsu

(57) ABSTRACT

A method of implementing push-to-talk (PTT) communication between network phone clients utilizing Session Initiation Protocol (SIP) Voice over Internet Protocol (VoIP) and multicast RTP, includes pushing a "Talk" button on a talking client to generate a PTT invitation message (via SIP INVITE or MESSAGE), transmitting the PTT invitation message from the talking client to a SIP server, transmitting the PTT invitation message from the SIP server to a PTT server, consulting a group list stored on the PTT server to identify a plurality of receiving clients associated with the talking client, sending the PTT invitation message from the PTT server to the plurality of receiving clients, the PTT server receiving acknowledgement of the PTT invitation message from the plurality of receiving clients. The PTT server arbitrates the token-requests of the clients, translates a unicast-to-multicast RTP of token-request and talk-burst packets, and then broadcasts to all clients.

20 Claims, 4 Drawing Sheets

METHOD FOR IMPLEMENTING PUSH-TO-TALK OVER SIP AND MULTICAST RTP RELATED SYSTEM

BACKGROUND OF THE INVENTION

1. Field of the Invention

The invention relates to push-to-talk devices, and more particularly, to a method for implementing push-to-talk over a SIP VoIP system using a network infrastructure.

2. Description of the Prior Art

Traditionally, push-to-talk (PTT) technology is most commonly seen in walkie-talkie devices. A button of the walkie-talkie is pushed and held down while a user talks into a microphone of the walkie-talkie. Other users are able to listen through a speaker on their own walkie-talkies. With the development of mobile phone networks, mobile phone operators such as 3G and GPRS network operators are starting to offer PTT services along with their mobile phone plans.

Recently, there has been a dramatic increase in the popularity of computer local area networks (LANs), particularly wireless LANs. This, together with the increasing numbers of people who have Internet access, has also brought about the rise of Voice over Internet Protocol (VoIP) communication. Session Initiation Protocol (SIP) is one of the real-time communication protocols used for VoIP, and supports other multimedia applications such as instant messaging, video, online games, and so on.

Unfortunately, there is currently no way to use the extensive computer LANs for performing PTT communication over SIP VoIP. Thus, users wishing to communicate through PTT have to use traditional walkie-talkies or use mobile phones that offer this special service. Traditional walkie-talkies have a limited communication range, whereas a charge is usually incurred for using a mobile phone to perform PTT communication. Moreover, neither makes use of the Internet, which is an enormous network connecting people all over the world.

SUMMARY OF THE INVENTION

Methods and systems for implementing PTT between network phone clients are provided. An exemplary embodiment of a method of implementing push-to-talk (PTT) communication between network phone clients utilizing Session Initiation Protocol (SIP) Voice over Internet Protocol (VoIP) includes pushing a "Talk" button on a first client to generate a PTT invitation SIP message, transmitting the PTT invitation unicast SIP message from the first client to a SIP server, transmitting the PTT invitation message from the SIP server to a PTT server, consulting a group list stored on the PTT server to identify a plurality of receiving clients associated with the first client, and sending the PTT unicast SIP invitation message from the PTT server to the plurality of receiving clients. The method also includes the PTT server receiving acknowledgement of the PTT invitation message from one or more of the plurality of receiving clients, the PTT server using RTP unicast-to-multicast translation to handle talk token management, and the client which got the token sending a unicast RTP PTT talk burst to the PTT server, the PTT server translating the unicast RTP PTT talk burst into a multicast RTP PTT talk burst in response to receiving the unicast RTP PTT talk burst from the talking client, and the PTT server broadcasting the multicast RTP PTT talk burst to receiving clients.

An exemplary embodiment of a PTT communication system utilizing SIP VoIP includes a first client for generating a PTT invitation message (it could be SIP INVITE or MESSAGE), a SIP server for receiving the PTT invitation message from the first client, and a PTT server for receiving the PTT invitation message from the SIP server, sending the PTT invitation message to a plurality of receiving clients identified in a group list associated with the first client and stored on the PTT server, and receiving acknowledgments of the PTT invitation message from one or more of the receiving clients to establish a PTT session between the first client and the receiving clients that acknowledged the PTT invitation message.

After the PTT session is established, any client of the group can push the "Talk" button to request the token of talking by sending the unicast token-request RTP packet to the PTT server, the PTT server chooses one client getting token and translates his unicast token-request RTP into multicast RTP forwarding to all clients. Only the client who got the token receives the source ID in the multicast RTP packet being from itself, and then can send-out talk burst.

The client, who wants to talk, pushes the Talk button and sends a unicast RTP PTT talk burst to the PTT server, the PTT server translates the unicast RTP PTT talk burst into a multicast RTP PTT talk burst, and the PTT server broadcasts the multicast RTP PTT talk burst to receiving clients.

Moreover, the clients of the group can join and leave the PTT session at any time by sending a SIP message to the PTT server. The PTT server sends a multicast RTP message to notify all participating clients whenever a client joins or leaves the PTT session.

It is an advantage of the present invention that a simple software upgrade can be performed on existing WiFi phones and VoIP phones for giving these phone clients the ability to perform PTT communication. Moreover, only a PTT server needs to be added to the existing network infrastructure for allowing the clients to have multicasting PTT sessions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
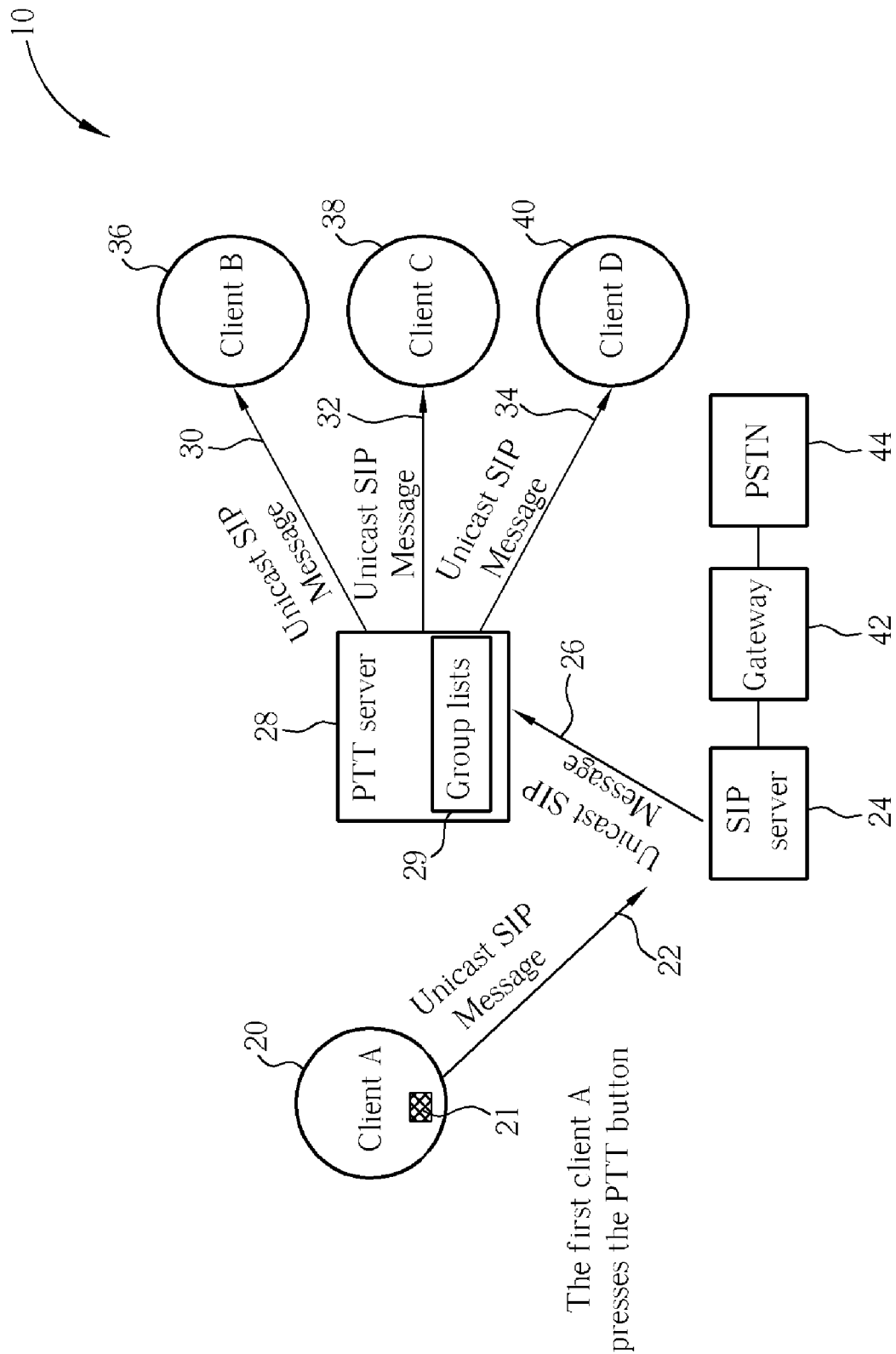
FIG. 1 is a block diagram of a push-to-talk (PTT) session establishment according to the present invention.

Please refer to FIG. 1. FIG. 1 is a block diagram of a push-to-talk (PTT) session establishment in communication system 10 according to the present invention. The PTT communication system 10 comprises a Session Initiation Protocol (SIP) server 24 for communicating with a plurality of network phone clients 20, 36, 38, 40 over a computer network such as a local area network (LAN), a wireless LAN, or the Internet. The SIP server 24 is connected to a public switched telephone network (PSTN) 44 through a gateway 42. The network phone clients 20, 36, 38, 40 are preferably Voice over Internet Protocol (VoIP) phones or Wireless Fidelity (WiFi) phones conforming to one of the IEEE 802.11x network standards. Therefore, the network phone clients 20, 36, 38, 40 can connect with the PSTN 44 via the SIP server 24 and the gateway 42 for completing normal telephone calls.

In addition, the PTT communication system 10 also contains a PTT server 28 for initiating multicast PTT sessions among the various network phone clients 20, 36, 38, 40. In effect, any existing VoIP phone or WiFi phone can receive a simple firmware upgrade for providing the phone with PTT capability. In addition, the SIP server 24 must also receive a software upgrade for providing a regular SIP VoIP communication system with the capability of PTT communication.

The PTT server 28 is used for handling PTT session management and for managing group lists 29 for the various network phone clients 20, 36, 38, 40. Each group list 29 contains a list of individual clients that are to be associated with each other such that multicast PTT sessions can be received by each client in the group.

When a network phone client is upgraded to have PTT capability, a designated "PTT" and "Talk" buttons on the client is used for starting and ending the PTT sessions. When the PTT button is first pushed, the user's client generates an invitation message that is sent to the other clients in the group for initiating the PTT session. When a user wants to talk to other clients in the group list 29, the designated "Talk" button is held down while the user speaks.

Figure 2:
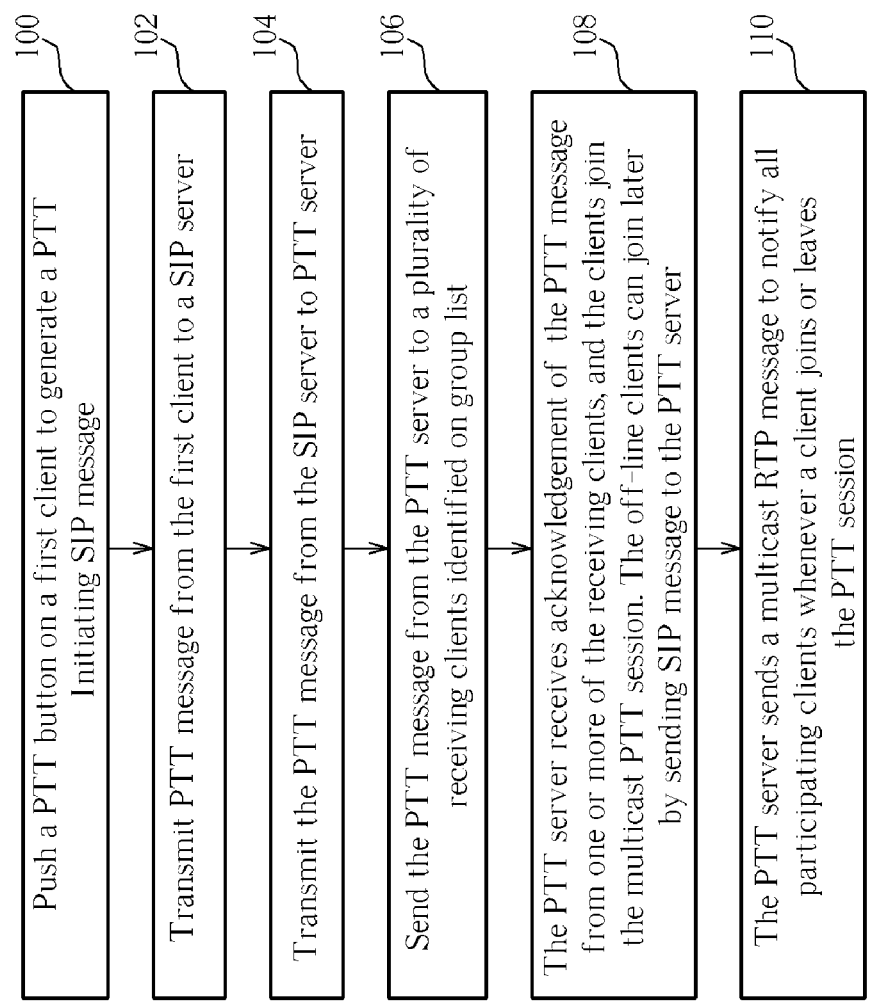
FIG. 2 is a flowchart illustrating initiating, joining, and leaving a PTT session according to the present invention.

To better understand operation of the present invention PTT communication system 10, please refer to FIG. 2. FIG. 2 is a flowchart illustrating initiating, joining, and leaving a multicast PTT session according to the present invention. Steps contained in the flowchart will be explained below Step 100: Push a PTT button 21 on client A 20 to generate a PTT message 22;

Step 102: Transmit the PTT message 22 from client A 20 to the SIP server 24;

Step 104: Forward the PTT message 26 from the SIP server 24 to the PTT server 28;

Step 106: Forward the PTT message 30, 32, 34 from the PTT server 28 to clients B-D 36, 38, 40, which were identified on the group list 29 stored in the PTT server 28;

Step 108: The PTT server 28 receives acknowledgement of the PTT message from one or more of the clients B-D 36, 38, 40, and the acknowledging clients join the multicast PTT session. The off-line clients can join later by sending SIP message to the PTT server; and Step 110: Whenever a new client wants to join in the multicast PTT session, or when a participating client wants to leave the multicast PTT session, these clients notify the PTT server 28 by SIP messages, which then notifies all other participating clients about the change of participating clients by multicast RTP packets.

If the receiving clients support auto answering, the clients can automatically acknowledge the PTT invitation message received from the transmitting client. If auto answering is not supported or some client phones are off-line (not registering to the SITP server 24), then manual acknowledgement can be used.

Figure 3:
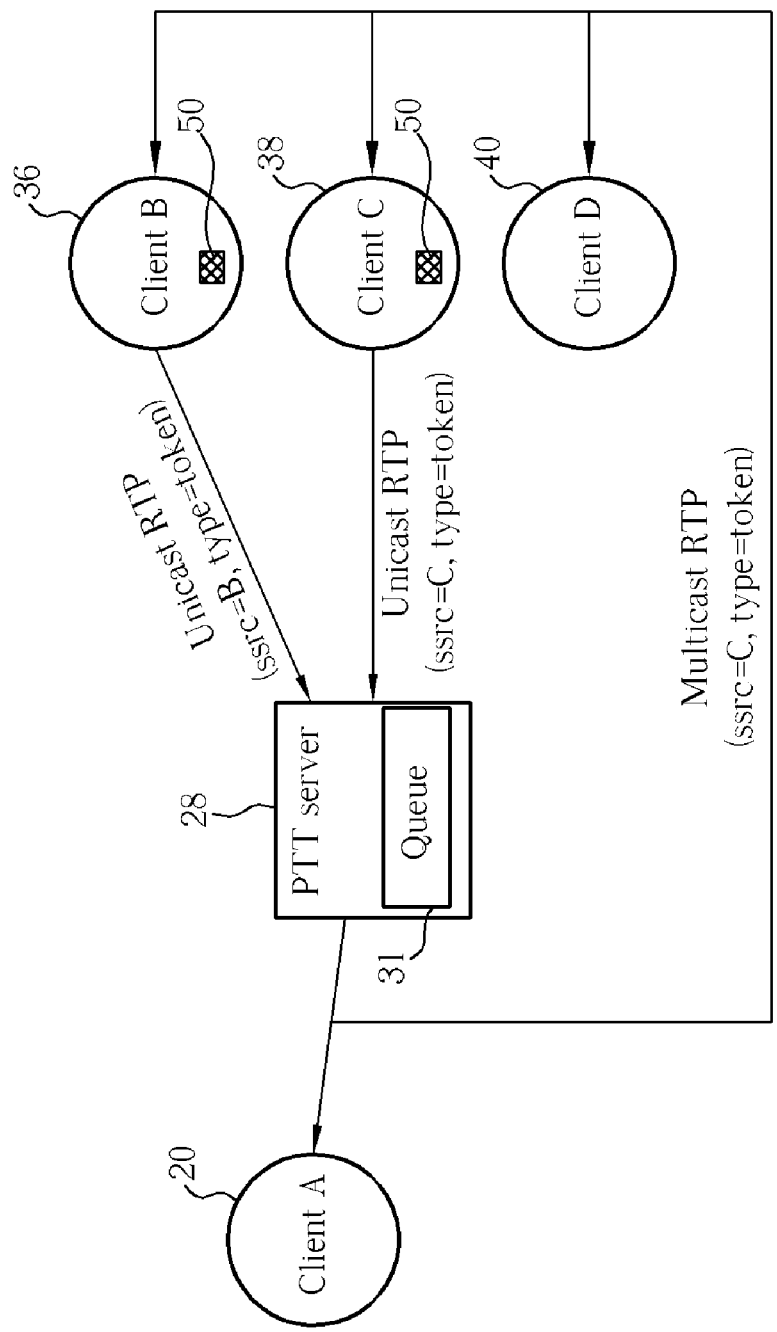
FIG. 3 is a block diagram of a push-to-talk (PTT) token management according to the present invention.

As the number of clients participating in a PTT session gets larger, there is a greater chance of two or more client users wanting to speak at the same time. To handle this, see FIG. 3, which illustrates PTT token management. The PTT server 28 receives unicast token-request RTP packets from Client B and Client C at the same time for example. The PTT server 28 can utilize a RTP packet queue 31 for receiving token requests from the various clients and performing arbitration, at every period of time, according to the order of the queue 31. The queue 31 can either be a traditional first in, first out (FIFO) queue, can place client's token requests in the queue 31 according to individual priorities of the clients, can use a combination of both, or can use other queuing schemes. The PTT server uses arbitration to determine which participating client obtains a token for translating the unicast token-request RTP to multicast token-request RTP, discarding the other token-request RTP, and then broadcasting to all clients.

Figure 4:
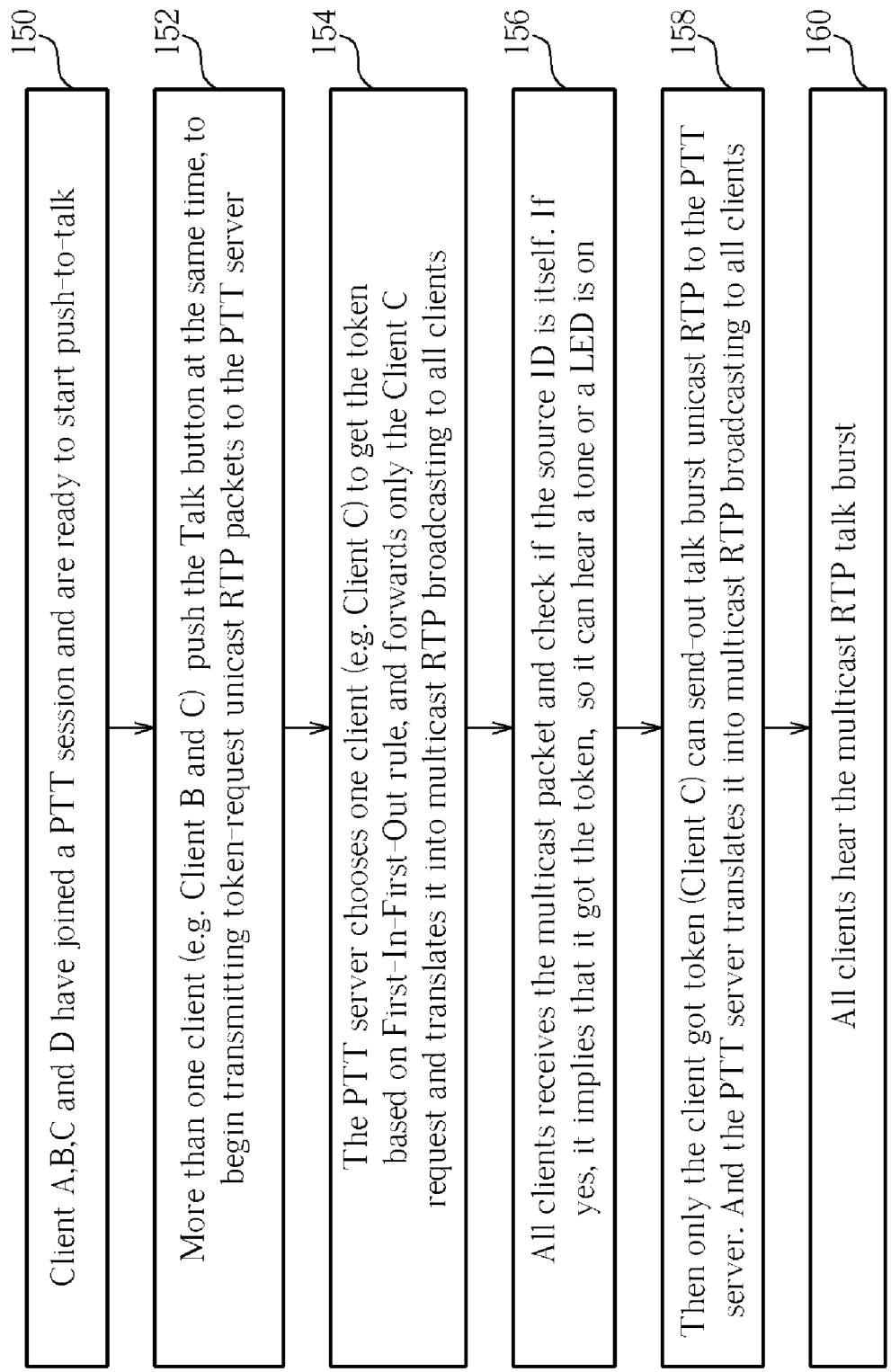
FIG. 4 is a flowchart illustrating Unicast-to-Multicast Translation of Token and Talk burst RTP packets.

To better understand the token passing scheme, please refer to FIG. 4. FIG. 4 is a flowchart illustrating clients obtaining a token from the PTT server for transmitting a multicast message to other clients according to the present invention. Steps contained in the flowchart will be explained below Step 150: Suppose client A 20, client B 36, client C 38 and client D 40 have joined in a PTT multicast session and they are all ready to start push-to-talk;

Step 152: Client B 36 and client C 38 push the Talk button 50 to begin transmitting token-request unicast RTP packets to the PTT server 28;

Step 154: The PTT server chooses one client (e.g. Client C) to get the token based on First-In-First-Out rule, and forwards only the Client C request and translates it into multicast RTP broadcasting to all clients;

Step 156: All clients receives the multicast packet and check if the source ID is itself. If yes, it implies that it got the token, so it can hear a tone or a LED is on;

Step 158: Then only the client got token (Client C) can send-out talk burst unicast RTP to the PTT server 28. And the PTT server 28 translates it into multicast RTP broadcasting to all clients (client A, B, C and D); and Step 160: All clients hear the multicast RTP talk burst.

Please note in the flowchart above that in step 156 client C 38 will receive the token-request RTP it generated. This serves as confirmation to the user of client C 38 that it received the token when pressing the "Talk" button 50 to generate the message. If two clients both requested the token at about the same time, only one of the clients would receive the token and be able to generate the multicast token-request RTP In this case, the users of both clients would need to listen to the broadcast multicast RTP in step 156 to determine if their client was given the token or not. Only the client that got the token (e.g. client C) can send-out the talk burst in step 158. And the PTT server translates it into multicast RTP broadcasting to all clients.

In steps 158 and 160 above, the client C 38 sends a unicast RTP PTT talk burst to the PTT server 28, and the PTT server 28 translates the unicast RTP PTT talk burst into a multicast RTP PTT talk burst that is then broadcast to all participating clients. However, the present invention can also bypass the PTT server 28. That is, in the example above, client C 38 could instead send a multicast RTP PTT talk burst to all other participating clients directly without first going through the PTT server 28.

Since the PTT sessions are one way broadcasts, half-duplex communication is used for broadcasting the messages. Since the same network infrastructure that is used for VoIP phone calls is also used for the multicast PTT sessions, the multicast PTT sessions will experience the same latency as VoIP phone calls, which is an acceptable level of latency.

As mentioned above, the PTT server 28 manages group lists 29, and each group list 29 contains a group of associated member clients. Member clients can be added or subtracted from a group list 29 through an administrator user interface of the PTT server 28. For instance, users can log into the PTT server 28 through a web site interface and create new group lists 29, delete existing group lists 29, or edit existing group lists 29 by adding or deleting member clients.

In summary, a PTT server can be added to existing VoIP networks for providing PTT capability. The SIP server, VoIP phones, and WiFi phones only require a small software upgrade to support the new functionality. Therefore, the present invention offers a simple and robust way to provide SIP VoIP networks with PTT functionality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of implementing push-to-talk (PTT) communication between network phone clients utilizing Session Initiation Protocol (SIP) Voice over Internet Protocol (VoIP) and multicast RTP mechanism, the method comprising:

pushing a "Talk" button on a talking client to generate a PTT invitation message (SIP INVITE or MESSAGE); transmitting the PTT invitation message from the talking client to a SIP server; transmitting the PTT invitation message from the SIP server to a PTT server; consulting a group list stored on the PTT server to identify a plurality of receiving clients associated with the talking client; sending the PTT invitation message from the PTT server to the plurality of receiving clients; the PTT server receiving acknowledgement of the PTT invitation message from one or more of the plurality of receiving clients; the talking client pushing the "Talk" button to send a unicast RTP token-request to the PTT server; the PTT server translating the unicast RTP into a multicast RTP token-request; and the PTT server broadcasting the multicast RTP to receiving clients; wherein when more than one clients push the "Talk" button at the same time by send the token-request unicast RTP packet to the PTT server, the PTT server acknowledges only one client by translating the unicast RTP to multicast RTP and then broadcasting to all clients, and after comparing the receiving multicast and generated unicast RTP packets, only the client that generated the request RTP can further send-out talk burst unicast RTP, where the PTT server receives the burst unicast RTP and translates it into multicast RTP broadcasting to all clients.

2. The method of claim 1, wherein when the "Talk" button is pushed on the talking clients, the PTT server issues a token to one of the talking clients.

3. The method of claim 2, further comprising: releasing the "Talk" button on the talking client; and the PTT server taking back the token from the talking client.

4. The method of claim 2, wherein the PTT server maintains a queue for storing token requests RTP packets from various clients.

5. The method of claim 4, wherein the queue maintained in the PTT server utilizes a priority system for assigning different priorities to different clients and assigning the clients a location in the queue according to their respective priorities.

6. The method of claim 1, wherein the PTT server additionally broadcasts the multicast RTP token-requests and PTT talk bursts to all clients, and all clients can check the source ID of received RTP packet, where if the source ID indicates that the client generated the RTP packet, the client gets and holds the token.

7. The method of claim 1, wherein the talking client sends the unicast RTP PTT talk burst using half-duplex communication.

8. The method of claim 1, wherein the receiving clients support auto answering for automatically acknowledging the PTT invitation message received from the talking client.

9. The method of claim 1, wherein the talking client is a wireless networking phone conforming to one or more of the IEEE 802.11x network standards.

10. The method of claim 1, wherein the talking client is a VoIP phone.

11. A push-to-talk (PTT) communication system utilizing Session Initiation Protocol (SIP) Voice over Internet Protocol (VoIP) and multicast RTP, the system comprising:

a talking client for generating a PTT invitation message;
a SIP server for receiving the PTT invitation message from the talking client; and
a PTT server for receiving the PTT invitation message from the SIP server, sending the PTT invitation message to a plurality of receiving clients identified in a group list associated with the talking client and stored on the PTT server, and receiving acknowledgments of the PTT invitation message from one or more of the receiving clients to establish a PTT session between the talking client and the receiving clients that acknowledged the PTT invitation message,
wherein after the PTT session is established, all clients in the group can start to talk, the talking client sends a unicast RTP token-request and followed by RTP PTT talk burst to the PTT server, the PTT server translates the unicast RTP into a multicast RTP token-request and PTT talk burst, and the PTT server broadcasts the multicast RTP to receiving clients.

12. The system of claim 11, wherein the talking client comprises a "Talk" button for generating the unicast RTP token-request and talk-burst for requesting a token from the PTT server when the button is pressed.

13. The system of claim 12, wherein when the "Talk" button on the talking client is released, the PTT server takes back the token from the talking client.

14. The system of claim 12, wherein the PTT server comprises a queue for storing unicast RTP token requests packets from various clients.

15. The system of claim 14, wherein the queue in the PTT server utilizes a priority system for assigning different priorities to different clients and assigning the clients a location in the queue according to their respective priorities.

16. The system of claim 11, wherein the PTT server additionally broadcasts the multicast RTP PTT talk burst to all clients.

17. The system of claim 11, wherein the talking client sends the unicast RTP PTT talk burst using half-duplex communication.

18. The system of claim 11, wherein the receiving clients support auto answering for automatically acknowledging the PTT invitation message received from the talking client.

19. The system of claim 11, wherein the talking client is a wireless networking phone conforming to one or more of the IEEE 802.11x network standards.

20. The system of claim 11, wherein the talking client is a VoIP phone.

* * * * *